United States Patent [19]

Lew

[11] Patent Number: 5,245,667
[45] Date of Patent: Sep. 14, 1993

[54] METHOD AND STRUCTURE FOR SYNCHRONIZING MULTIPLE, INDEPENDENTLY GENERATED DIGITAL AUDIO SIGNALS

[75] Inventor: Leland W. Lew, Santa Clara, Calif.

[73] Assignee: Frox, Inc., Sunnyvale, Calif.

[21] Appl. No.: 679,717

[22] Filed: Apr. 3, 1991

[51] Int. Cl.$^5$ .................... H04B 15/00; H04L 7/00
[52] U.S. Cl. ........................ 381/94; 375/106
[58] Field of Search ............. 375/118, 119, 107, 106; 370/108; 360/51, 32; 364/724.1; 381/94, 61, 63

[56] References Cited

U.S. PATENT DOCUMENTS

| | | | |
|---|---|---|---|
| 4,202,018 | 5/1980 | Stockham, Jr. | 360/32 |
| 4,473,850 | 9/1984 | Foerster | 360/32 |
| 4,758,907 | 7/1988 | Okamoto | 360/32 |
| 4,763,206 | 8/1988 | Takahashi | 360/32 |
| 4,827,490 | 5/1989 | Guerin | 375/119 |
| 4,856,030 | 8/1989 | Batzer et al. | 375/106 |
| 4,864,526 | 9/1989 | Dyer | 364/724.10 |

OTHER PUBLICATIONS

"AES Recommended Practice for Digital Audio Engineering-Serial Transmission Format for Linearly Represented Digital Audio Data," J. Audio Eng. Soc., vol. 33, No. 12, Dec. 1985, pp. 976-984.
Julius O. Smith and Phil Gossett, "A Flexible Sampling-Rate Conversion Method", IEEE, 1984, pp. 19.4.1-19.4.4.

Primary Examiner—James L. Dwyer
Assistant Examiner—Jack Chiang
Attorney, Agent, or Firm—Skjerven, Morrill, MacPherson, Franklin & Friel

[57] ABSTRACT

A method for synchronizing multiple digital signals is disclosed herein which synchronizes samples of audio information generated by independent digital audio sources to a single master sampling clock reference. An interpolation filter associated with each independent digital audio source determines an interpolated audio sample based on audio samples from the associated digital audio source and based on a ratio between the master sampling rate and the sampling rate of the associated digital audio source. This ratio is derived from averaging a code indicating the number of samples received from an associated one of the independent digital audio sources during each master sampling clock period. The interpolation filter for each of the independent digital audio sources uses this ratio in combination with the audio samples to output an interpolated sample at each master sampling clock reference signal. Using this method, any number of independent digital audio sources may have their outputs interpolated with the above-described interpolation filter, and the interpolation filters will output interpolated samples which are synchronous with one another.

22 Claims, 3 Drawing Sheets

METHOD AND STRUCTURE FOR SYNCHRONIZING MULTIPLE, INDEPENDENTLY GENERATED DIGITAL AUDIO SIGNALS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates to digital signal processing and, in particular, to an improved method and structure for efficiently processing digital audio signals generated by a plurality of independent sources.

BACKGROUND OF THE INVENTION

In a digital audio system for processing incoming digital audio signals generated by a variety of independent sources, such as by compact disc (CD) players and digital audio tape (DAT) players/recorders, it is known to process these independently generated digital audio signals by a centralized digital signal processor (DSP).

The central DSP processes the incoming digital information from the one or more digital audio sources. This processing typically includes functions such as audio volume control, balance, muting, graphic equalization, and the like, as well as more sophisticated audio effects such as surround-sound decoding, concert hall simulation, mixing, and reverberation. The processed digital information is then converted into low power analog signals, which are subsequently amplified by a high power amplifier for application to speakers.

A standardized format generally used in the digital audio industry for digitally encoding analog audio signals and transmitting these signals in a serial format is the Audio Engineering Society (AES) / European Broadcasting Union (EBU) standard. In the AES/EBU standard, each sample of a stereo (two channel) audio signal is encoded into a frame containing 64 bits. A typical sampling rate is 44.1 kHz. Thus, 44,100 frames are generated each second. Each frame consists of two subframes 32 bits wide, wherein a first subframe contains up to a 24 bit linearly represented sample of a first channel of audio information, and a second subframe contains up to a 24 bit linearly represented sample of a second channel of audio information.

The AES/EBU standard provides space in each subframe for conveying additional information, including a preamble, a validity bit, a user data bit, a channel status bit, and a parity bit. The organization of a frame format and the function of these additional information bits are described in the article entitled "AES Recommended Practice for Digital Audio Engineering—Serial Transmission Format for Linearly Represented Digital Audio Data," Journal of the Audio Engineering Society, Vol. 33, No. 12, December 1985. This article is incorporated herein by reference.

Typically, the digital audio signals supplied to the central DSP from the various independent digital audio sources are each processed by the DSP in accordance with a different sampling rate clock signal, since the various digital audio signals are not synchronized with one another. Thus, in the prior art, a number of separate clock signals must be used to clock the circuitry within the DSP for concurrently processing incoming data signals generated by multiple independent digital audio sources. This type of prior art device results in inefficient and often complicated processing requirements and circuitry within the DSP.

What would be desirable is a method and structure to more efficiently process digital audio signals concurrently generated by two or more independent digital audio signal sources.

SUMMARY OF THE INVENTION

An improved method and structure for synchronizing multiple digital signals generated by independent digital signal sources are disclosed herein.

In one embodiment of the invention, a digital signal processor (DSP), for processing digital audio signals generated by a plurality of independent digital audio signal sources, derives a reference sampling clock signal from a stream of digital audio information outputted by a first, or reference, digital audio signal source. This reference digital audio signal source may be a digital output of a CD player. This reference sampling clock signal, or master sampling clock signal, is generated at the start of each sample outputted by the reference digital audio signal source.

A second stream of digital audio information, generated by a second digital audio signal source, is loaded into a First-In-First-Out (FIFO) buffer within the DSP, which acts as a temporary storage device. In a preferred embodiment, the FIFO contains up to four samples of audio information or, in other words, four frames of audio information in the AES/EBU format.

As each new sample is received from the reference digital audio signal source, an Asynchronous Status Word Generator (ASWG) generates a code indicating the number of samples of digital audio information received from the second digital audio signal source during each master sampling clock period. Since the sampling clock rates of the two digital audio signal sources will be generally similar (i.e., 44.1 kHz), the asynchronous status word (ASW) output of the ASWG will be a 0, 1, or 2 code. The ASWG will normally generate a 1 code; however, occasionally a 2 code will be generated if the sampling rate for the second digital audio source is greater than the master sampling clock rate. Likewise, occasionally a 0 code is generated by the ASWG if the sampling rate for the second digital audio source is less than the master sampling clock rate.

The ASW (e.g., 0, 1, or 2 code) generated each master sampling clock period directs the FIFO (storing audio information from the second digital audio signal source) to discharge 0, 1, or 2 samples of digital audio information stored therein. In this way, space is made available in the FIFO for receiving subsequent samples of audio information. Thus, the FIFO acts to buffer digital audio data received by the DSP from the second digital audio source at a rate and phase different from the digital audio data received by the DSP from the reference digital audio source.

The ASW is also applied to a digital interpolating filter along with the digital audio data contents discharged from the FIFO. This digital filter interpolates between two incoming samples of the digital audio data so as to predict what an actual sample of audio data would be at each master sampling clock signal interval. The algorithm used by the interpolation filter may be those well known in the art.

The master sampling clock signal, which acts as the reference sampling clock, is also applied as an input to the interpolating filter. For each master sampling clock period, the interpolating filter will output an interpolated sample of digital audio information associated with the second digital audio signal source which is thus synchronous in sampling frequency and sampling phase with the master sampling clock. Hence, samples associated with the second digital audio signal source outputted by the interpolating filter will be synchronous with samples associated with the reference digital audio source.

In addition, the digital interpolating filter can be implemented such that the interpolated output samples possess negligible signal quality degradation as compared to the filter's input samples.

The now synchronous samples from the reference digital audio signal source and the second digital audio signal source may then be processed concurrently within the DSP using only a single master sampling clock, enabling a more efficient processing structure within the DSP.

This method and structure may be used to synchronize the outputs of an unlimited number of independent digital audio signal sources, wherein an ASWG and interpolating filter are allocated to each independent source.

Since other information (e.g., control information) contained in the AES/EBU format, which is not digital audio information, must also be processed, this information is buffered in a manner analogous to the audio data, but treated separately. For example, control data within a subframe in the AES/EBU format may be buffered and passed to a main central processing unit (CPU) within the DSP, with the control data not subjected to interpolation, since interpolation is applicable to audio data only.

DETAILED DESCRIPTION OF THE PREFERRED EMBODIMENT

Figure 1:
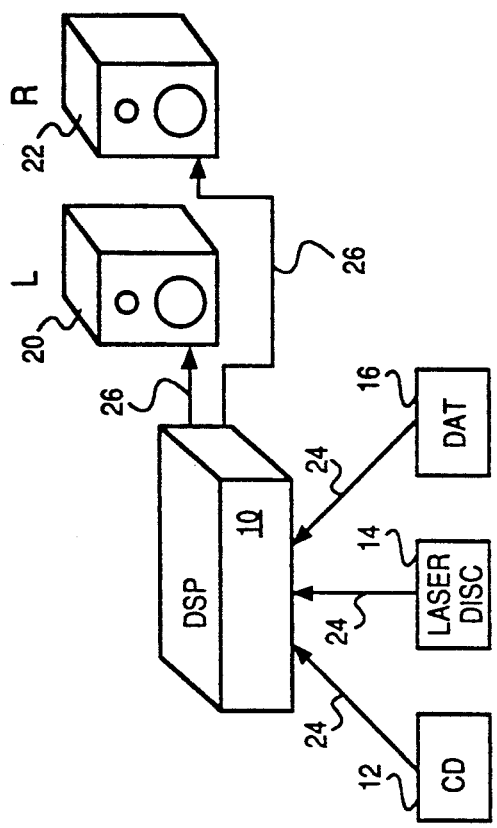
FIG. 1 illustrates one embodiment of a digital audio system containing the present invention, wherein the digital audio system is connected to various digital audio signal sources and connected to speakers.

FIG. 1 shows a digital signal processor (DSP) 10 which contains digital processing circuitry for processing digital signals outputted from digital audio components, such as a compact disc (CD) player 12, a laser disc player 14, and a digital audio tape (DAT) recorder/player 16. DSP 10 processes incoming digital signals in the various manners described below and applies either digital or analog signals to a left channel speaker 20 and a right channel speaker 22. Additionally, DSP 10 may apply digital audio signals to DAT recorder/player 16 for recording.

Electrically conductive cables or fiber optic cables 24 carry digital information from devices 12, 14, and 16 to DSP 10 (and from DSP 10 to DAT recorder/player 16), and electrically conductive cables or fiber optic cables 26 carry audio information to speakers 20 and 22.

In the embodiment of FIG. 1, one may desire to simultaneously process digital signals generated by multiple independent audio sources 12, 14, and 16 using DSP 10 and output the processed signals to multiple receiving devices, such as DAT player/recorder 16 and speakers 20 and 22. For example, the user may be viewing a movie from laser disc player 14 and listening to its audio tracks, wherein the audio tracks have been processed through DSP 10 to add audio special effects prior to being transmitted to speakers 20 and 22. Simultaneously, the user may desire to record a compact disc playing on CD player 12 and require processing by DSP 10 before recording by DAT recorder/player 16.

The method and structure described below synchronizes audio samples from these multiple independent audio sources so the audio samples can be processed concurrently by DSP 10 using a single master sampling clock. This results in a much more efficient DSP implementation.

Digital signals supplied to DSP 10 by digital audio devices 12, 14, and 16 are assumed to be in the generally used serial AES/EBU format, which dictates the arrangement of digital audio signals and various control signals within a frame of information generated once per audio sample.

DSP 10 is preferably designed to also accept digital audio signals in the well known Sony/Philips Digital Interface Format (SPDIF), which is widely used in consumer applications and differs from the AES/EBU format only in the usage of the channel status control bits, to be described later with respect to FIG. 2.

Figure 2:
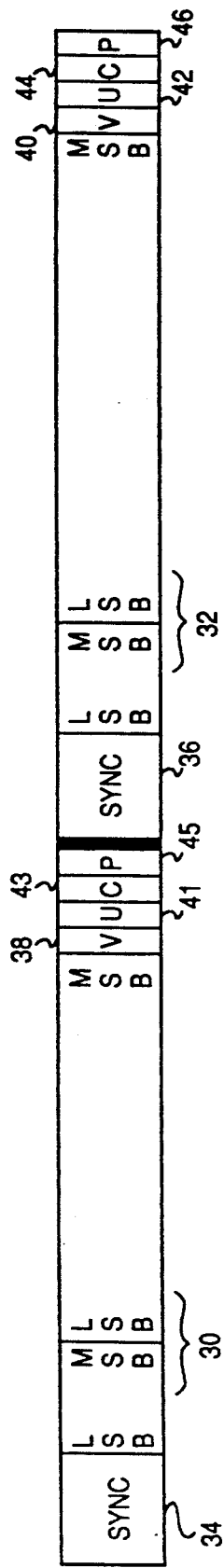
FIG. 2 illustrates the AES/EBU format for digital audio signals.

The standard and well known AES/EBU format is illustrated in FIG. 2. In the conventional AES/EBU format, a left and right channel of analog audio signals, such as stereo audio signals, are sampled simultaneously at a sampling rate on the order of 44.1 kHz. A single left channel sample is typically encoded into up to 24 bits and contained in field 30 in a first subframe, and a single right channel sample is typically encoded into up to 24 bits and contained in field 32 in a second subframe. The first and second subframes form a single frame of digital audio information so that 44,100 frames per second effectively provide a digital representation of the stereo analog signals. The serial digital data is then biphase modulated (known as a Manchester family coding scheme) before transmission in order to enable synchronization and clock extraction from the data stream itself. Given digital signals in this AES/EBU format, well known and conventional techniques are used to decode these digital signals to reproduce the original analog audio signal.

Additional bit fields are also provided in the AES/EBU format which perform various well known functions. Referring to FIG. 2, preamble fields 34 and 36 provide synchronizing and identifying preambles for digital audio fields 30 and 32, respectively. The preambles are used for identifying the start of a first or second subframe and the start of a block of frames (i.e., 192 frames). One-bit fields 38 and 40 contain a validity bit to indicate whether the audio sample is valid or defective. One-bit fields 41 and 42 contain a user bit to convey any information desired by the user. One-bit fields 43 and 44 contain a channel status bit, which are combined in a block of frames to convey various system parameters. One-bit fields 45 and 46 contain a parity bit to enable the simple detection of transmission errors.

Circuitry for decoding such non-audio digital signals in an AES/EBU format are conventional.

Each of devices 12, 14, and 16 in FIG. 1 may apply different information to DSP 10 at independent sample clock frequencies and phases in identical AES/EBU formats.

To properly decode the information contained in the AES/EBU format shown in FIG. 2, a master sampling clock must be generated which designates a start of a sample period, and a master bit clock must be generated which is synchronous with the incoming bits within the frame shown in FIG. 2. Generating the master sampling clock signal and the master bit clock signal is obtained using an analog phase-locked-loop (PLL) which is triggered by the bit transitions themselves, as is well known to those of ordinary skill in the art.

Figure 3:
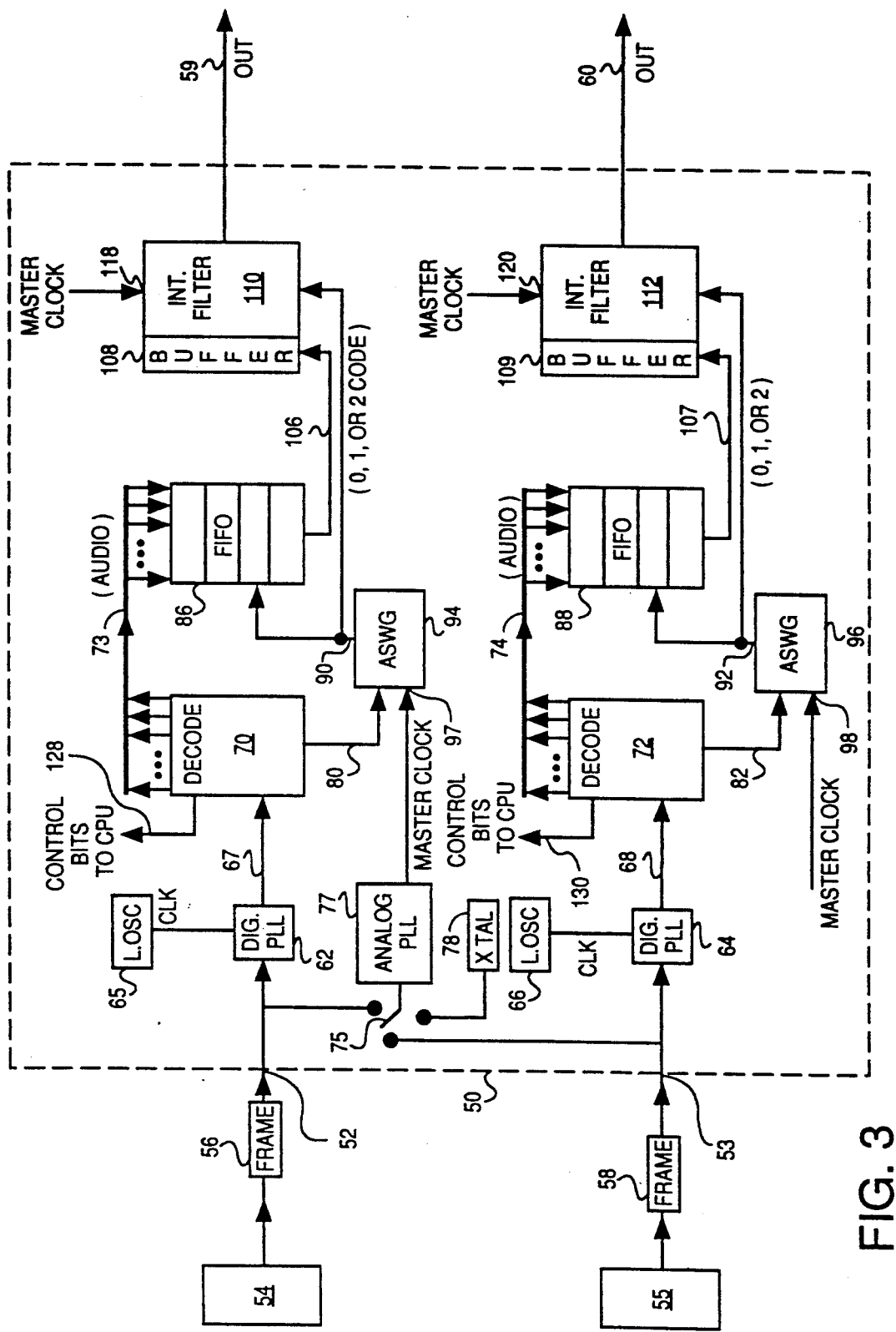
FIG. 3 illustrates circuitry which implements the method of the present invention to synchronize independently generated digital audio signals.

FIG. 3 shows one embodiment of circuitry to carry out the present invention, which synchronizes the samples outputted by digital audio devices 12, 14, and 16.

In FIG. 3, the pertinent portion of DSP 10 in FIG. 1 is shown within dashed outline as digital circuitry 50. Incoming frames of digital data in the AES/EBU format are applied to terminals 52 and 53 of digital circuitry 50 from two separate digital audio devices, designated in this example as device 54 and device 55, although many more devices may be connected to digital circuitry 50. It should be noted that buffer circuitry may be connected to terminals 52 and 53 to, for example, convert an incoming optical signal to an electrical signal and/or to provide the proper voltage levels for subsequent processing of the incoming digital signals.

As indicated in FIG. 3, a frame 56, or sample, of information outputted by device 54 is being applied to terminal 52 slightly prior to a frame 58 from device 55 being applied to terminal 53. This indicates that the independent sampling clocks in device 54 and device 55 are not synchronous with one another in frequency or phase. In accordance with this invention, digital circuitry 50 processes non-synchronous frames 56 and 58 and outputs synchronous samples of digital audio signals associated with devices 54 and 55 on lines 59 and 60, respectively.

In digital circuit 50, frames 56 and 58, generated by devices 54 and 55, respectively, are applied to digital phase-locked-loops (PLL) 62 and 64, respectively, which oversample the incoming digital information at a clock rate higher (e.g., six to eight times) than the actual bit rate of the incoming digital information, using well known techniques. An oversampling clock signal, which is generated independently within DSP 10 by, for example local oscillators 65 and 66, is applied to respective clock terminals of PLLs 62 and 64.

Digital PLLs 62 and 64 detect preambles, such as preambles 34 and 36 (shown in FIG. 2), within the subframes of the incoming serial digital audio signals, and, in response to such detection, synchronize themselves with respect to the remaining data bits in the subframes using well known techniques. The digital PLLs 62 and 64 then perform biphase demodulation on the coded, transmitted AES/EBU signals, using well-known means, and output the demodulated audio data and auxiliary control bits on lines 67 and 68. The clocking information derived from the serial data stream is provided by PLLs 62 and 64 to various other circuitry in FIG. 3, as would be understood by those of ordinary skill in the art, to enable the proper latching of the data bits by the various circuitry.

In a preferred embodiment, much of the circuitry for DSP 10 is implemented in hardware, using an application specific integrated circuit (ASIC). Appendices A and B contain ASIC source net lists for the pertinent portion of the digital PLLs 62 and 64 (including edge detection and biphase demodulation circuitry) used in this preferred embodiment. These net lists contain all inputs, outputs, and internal signals for the circuits. All net lists and codes in the appendices are copyrighted.

These net lists are compatible with LSI Logic Corporation's logic design system (LDS) and modular design environment (MDE) chip design tools. The ASIC used in this preferred embodiment is compatible with LSI Logic's LSC15 family of cell-based 1.5 micron HCMOS ASIC technology.

The demodulated digital data outputted by digital PLLs 62 and 64 is then applied to decoding circuitry 70 and 72 for separating digital audio information within each sample from control information and converting the digital audio information into parallel form, which is more desirable for subsequent digital processing. Circuitry for performing such decoding of AES/EBU format signals is well known in the field. Each sample of digital audio information in parallel form is then outputted onto the appropriate one of buses 73 and 74. Clocking information for performing such decoding by circuitry 70 and 72 is obtained from the subframes' synchronizing preambles and bit transitions themselves. The clock signals conventionally applied to decoding circuitry 70 and 72 and to other circuitry are not shown in FIG. 3 for simplicity; however, one of ordinary skill in the art will be aware of such clocking input signals.

Analog PLL 77 provides the master sampling clock signal to which all other digital audio signals are made synchronous. In one embodiment for deriving such clocking information, the incoming signal at either terminal 52 or 53 is selected, via switch 75, as an input to analog PLL 77, which performs precise master sampling and bit clock extraction from the bit transitions of the serial digital data stream, using techniques well known in the art.

In another embodiment, the master sampling clock signal may be generated by analog PLL 77 using an independent local crystal oscillator (Xtal) clock 78 within DSP 10 as a reference source. For purposes of this illustration, it will be assumed that the master sampling clock is derived from the output of device 54.

Importantly, both decode circuitry 70 and 72 provide a sampling clock output on lines 80 and 82, respectively, which signals the beginning of a new sample of digital information provided by its associated independent digital audio source 54 or 55.

Each sample of digital audio information associated with device 54 is temporarily stored in a First-In-First-Out (FIFO) buffer 86, which, in one embodiment, stores a total of four samples of digital audio information. Similarly, an identical FIFO buffer 88 temporarily stores samples of digital audio information associated with device 55. FIFO buffers 86 and 88 provide buffering to temporarily store the digital information to allow the stored data to be read at any time during a given master sampling clock period. These samples stored in FIFOs 86 and 88 are then consecutively discharged from FIFOs 86 and 88 in accordance with signals, to be described below, on lines 90 and 92, respectively.

The derived sampling clock signal on line 80 from decode circuitry 70 is applied to associated Asynchronous Status Word Generator (ASWG) 94, while the derived sampling clock signal on line 82 from decoder 72 is applied to associated ASWG 96. In a preferred embodiment, ASWGs 94 and 96 are implemented in hardware using the same ASIC hardware discussed previously. Appendix C contains an ASIC source net list for ASWG 94.

The master sampling clock signal is also applied to a separate terminal 97 and 98 of ASWGs 94 and 96, respectively.

ASWGs 94 and 96 determine the number of samples of digital information outputted on buses 73 and 74 by decode circuitry 70 and 72, respectively, within one master sampling clock period. If the output of device 54 is to be used to generate the master sampling clock, then the code outputted by ASWG 94 on line 90 will necessarily represent exactly one sample presented on line 80 during each master sampling clock period. If an independent local Xtal 78 is to be used as the reference, the output of ASWG 94 will most likely fluctuate between a 0, 1, or 2 code, assuming the sampling clock rates are roughly identical.

With regard to ASWG 96, associated with device 55, ASWG 96 determines the number of sampling clock pulses on line 82 for each master sampling clock period. ASWG 96 will output on line 92 a 0 code if no sampling clock pulses are received on line 82 during one master sampling clock period, a 1 code if one sampling clock pulse is received during one master sampling clock period, or a 2 if two sampling clock pulses are received during one master sampling clock period. Typically, if two samples are indicated by decoder 72 as occurring during a single master sampling clock period, this will be followed by a 1 output code by ASWG 96, since the master sampling clock and the sampling clock signal from decoder 72 will generally be at a similar rate.

Figure 4:
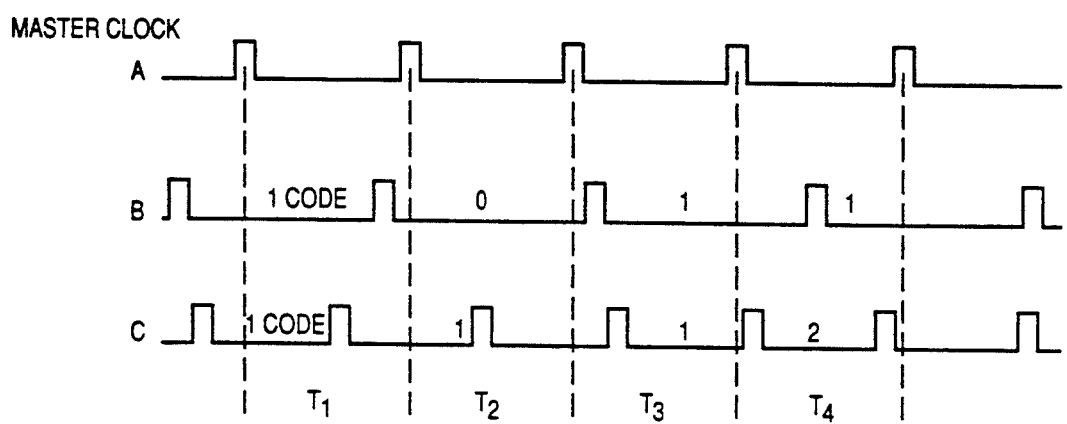
FIG. 4 illustrates the generation of an asynchronous status word.

FIG. 4 illustrates how ASWG 94 or 96 determines whether a 0, 1 or 2 code is to be outputted. In FIG. 4, a reference master sampling clock rate is shown as waveform A. This reference master sampling clock may be derived from either Xtal 78 or device 54 in FIG. 3. Waveform B represents a sampling clock derived from the output of device 55, which is slightly slower than the master sampling clock waveform A. As seen, for waveform B during interval T1, ASWG 96 outputs a 1 code. In interval T2, ASWG 96 outputs a 0 code. And, in intervals T3 and T4, ASWG 96 outputs a 1 code.

An example of a sampling clock derived from the output of device 55 which is slightly faster than the master sampling clock waveform A is shown by waveform C. For waveform C, ASWG 96 would output a 1 code in intervals T1, T2, and T3 but would output a 2 code for interval T4, since there are two samples which have occurred within interval T4.

The outputs of ASWGs 94 and 96 on lines 90 and 92 signal FIFOs 86 and 88, respectively, to discharge from memory a number of samples corresponding to the output code on lines 90 and 92. Thus, depending on whether the output of ASWGs 94 and 96 is a 0 code, a 1 code, or a 2 code, FIFOs 86 and 88 would discharge 0 samples, 1 sample, or 2 samples. In this way FIFOs 86 and 88 will always have available space for new samples.

Samples outputted in FIFOs 86 and 88 on lines 106 and 107, respectively, are temporarily stored in delay buffers 108 and 109 within interpolating filters 110 and 112, respectively, and the stored samples are processed by interpolating filters 110 and 112, which interpolate between two successive samples by using predetermined coefficients contained in memory within filters 110 and 112. Such processing is well known to those of ordinary TM skill in the art.

In one embodiment, each delay buffer 108 and 109 is a RAM which stores the most recent 28 samples. Interpolating filters 110 and 112 are microprocessor-based computing engines which carry out a well known type of program for synchronizing sampling rates to a reference clock so that a sample of information outputted by the interpolating filter will be synchronous with the reference clock and have negligible signal quality degradation. In one embodiment, the microprocessor used in each of filters 110 and 112 is a Motorola DSP 56001. One known algorithm which may be carried out by interpolation filters 110 and 112 is that algorithm described in the article entitled "A Flexible Sampling-Rate Conversion Method," by Julius Smith et al., IEEE International Conference on Acoustics, Speech, and Signal Processing, Vol. 2, Mar. 19, 1984, incorporated herein by reference. Appendix D is a sample program which may be used in each interpolation filter for generating the filter coefficients for the digital audio samples entering the interpolation filter.

Interpolation filters 110 and 112 also receive output signals from ASWGs 94 and 96 via lines 90 and 92, respectively, and also receive the master sampling clock signal at terminals 118 and 120, respectively. Interpolation filters 110 and 112 essentially compute the average ratio of the master sampling clock rate to the sample rate derived from the output of an associated one of devices 54 and 55. This ratio may be simply derived by averaging out the ASW outputted by ASWGs 94 and 96. This ratio is then used in the interpolation algorithm to interpolate between two successive samples of digital audio information contained in delay buffers 108 and 109 within filters 110 and 112 so as to predict the actual digital audio information which would have been generated by device 54 or device 55 at the time of occurrence of each master sampling clock signal. Of course if the master sampling clock was derived from device 54, there would be no interpolation by filter 110 since the ratio would be one.

The interpolation filters 110 and 112 output a modified digital audio information signal on lines 59 and 60, respectively, upon each application of the master sampling clock signal to terminals 118 and 120. Thus, the outputs of interpolation filters 110 and 112 will be synchronous with each other.

The synchronous digital audio information outputted by interpolation filters 110 and 112 on lines 59 and 60 may then be simultaneously efficiently processed by downstream digital circuitry and/or digital signal processors clocked at a single master sampling clock rate.

Control bits and other non-audio information contained in frames 56 and 58 are separated out by decoding circuitry 70 and 72 and outputted on lines 128 and 130. This non-audio information may be handled in a manner similar to that described with respect to FIG. 3. For example, control data within a subframe in the AES/EBU format may be buffered and passed to a main central processing unit (CPU) within the DSP, with the control data not subjected to interpolation, since interpolation is applicable to audio data only. In one embodiment, to save processing time, these non-audio bits are first arranged in subblocks before being reviewed for information content, instead of on a frame to frame basis. For example, one subblock can be generated for every eight frames applied to the input of decoding circuitry 70 and 72. These non-audio bits may be used in any appropriate manner as would be known to those skilled in the art.

Thus, a novel method and structure have been disclosed herein which can be used in digital audio systems and other systems which process digital information generated by multiple sources which are not synchronized with respect to one another. In the manner described above, digital audio information from a variety of sources may be made synchronous with one another so as to be processed by digital signal processing circuitry using a common master sampling clock rate, thus greatly simplifying this processing circuitry and providing numerous other advantages which would be appreciated by those of ordinary skill in the art.

While particular embodiments of the present invention have been shown and described, it will be obvious to those skilled in the art that changes and modifications may be made without departing from this invention in its broader aspects and, therefore, the claims are to encompass within their scope all such changes and modifications as falling within the true spirit and scope of this invention.

What is claimed is:

1. A method for synchronizing independently generated digital audio signals comprising the steps of:
   generating a master sampling clock signal for acting as a reference sampling clock signal;
   storing samples of first digital audio data from a first digital audio signal source in a first first-in-first-out (FIFO) buffer;
   generating a first signal which indicates a number of samples generated by said first digital audio signal source for every master sampling clock signal period;
   discharging stored samples in said first FIFO buffer in accordance with said first signal;
   interpolating samples of said first digital audio data in a first interpolation filter based on samples discharged by said first FIFO buffer and based on said first signal; and
   outputting first interpolated digital audio information at a rate synchronous with said master sampling clock signal.

2. The method of claim 1 wherein said master sampling clock signal is derived from digital audio samples outputted by a second digital audio signal source.

3. The method of claim 1 wherein said master sampling clock signal is derived from a local oscillator.

4. The method of claim 1 wherein said samples discharged by said FIFO buffer are temporarily stored in a first delay buffer for access by said first interpolation filter so that said first interpolation filter provides interpolated samples based on recent samples discharged by said FIFO and earlier samples discharged by said FIFO.

5. The method of claim 4 wherein an average ratio of said master sampling clock signal period to said number of samples generated by said first digital audio signal source is applied to said first interpolation filter to enable said first interpolation filter to interpolate said samples of digital audio data.

6. The method of claim 5 further comprising the steps of:
   storing samples of second digital audio data from a second digital audio signal source in a second FIFO buffer;
   generating a second signal which indicates a number of samples generated by said second digital audio signal source for every master sampling clock signal period;
   discharging stored samples in said second FIFO buffer in accordance with said second signal;
   interpolating samples of said second digital audio data in a second interpolation filter based on samples discharged by said second FIFO and said second signal; and
   outputting second interpolated digital audio information from said second interpolation filter at a rate synchronous with said master sampling clock signal and with an output of said first interpolation filter.

7. The method of claim 6 wherein said master sampling clock signal is derived from digital audio samples outputted by said second digital audio signal source.

8. The method of claim 6 wherein said master sampling clock signal is derived from the local oscillator.

9. The method of claim 1 wherein digital audio data outputted by said first digital audio signal source is in an AES/EBU format.

10. The method of claim 9 wherein control data outputted by said first digital audio signal source along with said first digital audio data in said AES/EBU format is separated from said first digital audio data prior to said first digital audio data being stored in said FIFO buffer, said control data not being subject to interpolation.

11. A circuit for synchronizing independently generated digital audio signals comprising:
    a master sampling clock signal source for acting as a reference sampling clock signal;
    a first buffer for storing samples of digital audio data from a first digital audio signal source;
    a first means for generating a first signal indicating a number of samples generated by said first digital audio signal source for every master sampling clock signal period, an output of said first means for generating being connected to said first buffer to cause said first buffer to discharge stored samples in accordance with said first signal;
    a first interpolation filter, connected to said output of said first means for generating, for interpolating samples of said digital audio data based on samples discharged by said first buffer and based on said first signal, wherein said first interpolation filter is for outputting interpolated digital audio information at a rate synchronous with an output of said master sampling clock signal source.

12. The circuit of claim 11 wherein said first buffer is a first-in-first-out (FIFO) buffer.

13. The circuit of claim 11 wherein said output of said master sampling clock signal source is based on an output of a second digital audio signal source.

14. The circuit of claim 11 wherein said output of said master sampling clock signal is based on an output of a local oscillator.

15. The circuit of claim 11 wherein said samples discharged by said first buffer are temporarily stored in a first delay buffer for access by said first interpolation filter so that said first interpolation filter provides interpolated samples based on recent samples discharged by said first buffer and earlier samples discharged by said first buffer.

16. The circuit of claim 15 wherein said first buffer is a FIFO buffer.

17. The circuit of claim 11 wherein an average ratio of said master sampling clock signal period to said number of samples generated by said first digital audio signal source is applied to said first interpolation filter to enable said first interpolation filter to interpolate said samples of digital audio data.

18. The circuit of claim 11 further comprising:
a second digital audio signal source;
a second buffer for storing samples of digital audio data from said second digital audio signal source;
a second means for generating a second signal indicating a number of samples generated by said second digital audio signal source for every master sampling clock period, an output of said second means for generating being connected to said second buffer to cause said second buffer to discharge stored samples in accordance with said second signal;
a second interpolation filter, connected to said output of said second means for generating, for interpolating samples of said digital audio data from said second digital audio signal source based on samples discharged by said second buffer and based on said second signal, wherein said second interpolation filter is for outputting interpolated digital audio information associated with said second digital audio signal source at a rate synchronous with said output of said master sampling clock signal source and with an output of said first interpolation filter.

19. The circuit of claim 18 wherein said output of said master sampling clock signal source is based on an output of said second digital audio signal source.

20. The circuit of claim 18 wherein said output of said master sampling clock signal source is based on an output of the local oscillator.

21. The circuit of claim 11 further comprising a first decoder means connected to an input of said first means for generating, said first decoder means providing a signal to said first means for generating indicating a receipt of a sample of digital audio data from said first digital audio signal source.

22. The circuit of claim 21 wherein said first signal outputted by said first means for generating is a 0, 1, or 2 code for each master sampling clock signal period, causing said first buffer to discharge a number of samples corresponding to said 0, 1, or 2 code.

* * * * *